Oct. 26, 1954

L. F. CARTER 2,692,441

DAMPER FOR GYROCOMPASSES

Filed April 7, 1953

INVENTOR
LESLIE F. CARTER
BY
ATTORNEY

Oct. 26, 1954   L. F. CARTER   2,692,441
DAMPER FOR GYROCOMPASSES
Filed April 7, 1953   2 Sheets-Sheet 2
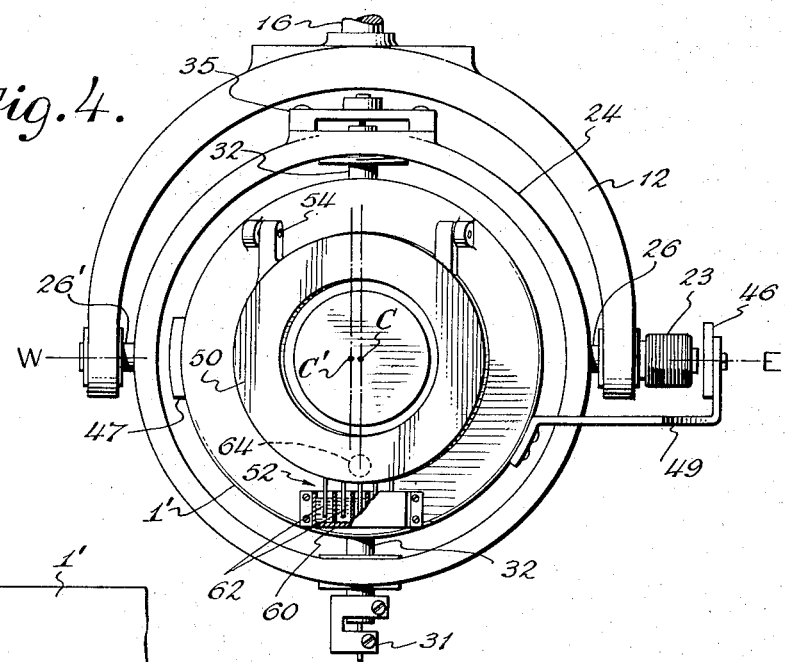
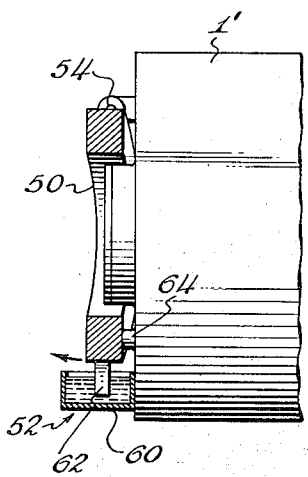
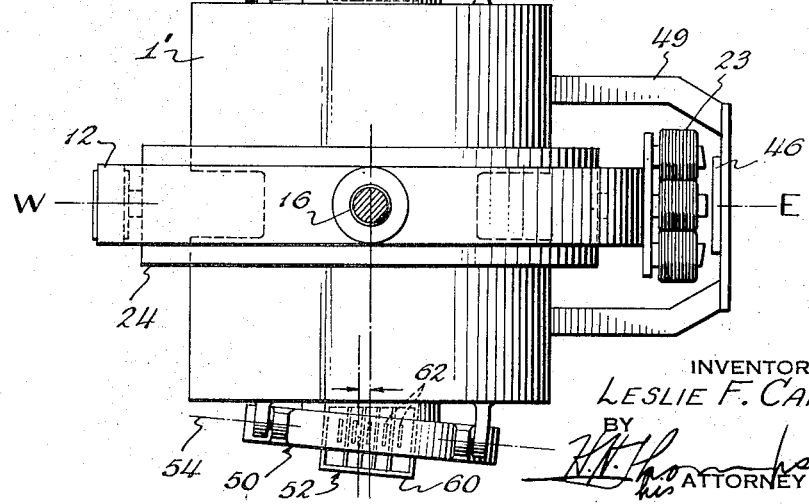
INVENTOR
LESLIE F. CARTER
BY
ATTORNEY.

Patented Oct. 26, 1954

2,692,441

UNITED STATES PATENT OFFICE 2,692,441

DAMPER FOR GYROCOMPASSES

Leslie F. Carter, Leonia, N. J., assignor to The Sperry Corporation, a corporation of Delaware Application April 7, 1953, Serial No. 347,352

6 Claims. (Cl. 33—226)

This invention relates to gyro compasses and especially to a simplified means for damping the same. The invention is especially adapted to gyro compasses of the type wherein the rotor case is pivoted about a vertical axis within a surrounding vertical ring, which in turn is pivoted for freedom about a horizontal axis within the follow-up frame or phantom. In other words, the major axis of the rotor case is horizontal instead of vertical as in most gyro compasses. Such a compass is sometimes referred to as a reverse gimbal gyro compass and was first described in the patent to Arthur L. Rawlings, No. 1,923,885, dated August 22, 1933. A more modern type is shown in my prior copending application Serial No. 213,262, filed February 28, 1951, for Gyrocompasses, in which a double rotor is shown. For damping such compasses, it is now customary to make the rotor case slightly heavy on the west side thereof, as described in both the aforesaid patent and application, thereby applying a damping torque about the vertical axis of the compass when the compass becomes tilted, as well as the major or meridian seeking torque about the horizontal axis.

This method of damping, however, while extremely simple, has the disadvantage that the eccentric or unbalanced mass is subject to acceleration forces during rolling or pitching of the ship, which gives rise to unidirectional cumulative torques produced by the eccentrically disposed damping mass resulting in error in the reading of the compass in rough weather.

By my invention, I avoid this error by rendering the torque about the vertical axis caused thereby, out of phase with relation to the ship's roll. Preferably, I employ the gravitational factor itself, which may be a liquid ballistic and in which the torque about the horizontal axis is made out of phase with the ship's roll, as a means by which the damping torque is also secured. If the liquid ballistic is directly mounted on the rotor casing, this result may readily be obtained by inclining the walls of the containers to the west and positioning the same so that when the gyro casing is level, the center of gravity of the mercury is in the same vertical plane as the spin axis of the gyro rotor. When, however, the rotor casing becomes inclined, the liquid flows to the low side thereby not only displacing the center of gravity about the horizontal axis of the compass toward the low side, but also displacing the center of gravity slightly to the west of the plane of the spin axis.

In this type of compass in which the minor axis is vertical, this results in a torque about the vertical axis in the proper direction to reduce the tilt and damp the compass. If the ballistic is in the form of pendulums pivoted on the case and damped by viscous dampers as in my continuing application for patent Serial No. 350,634, filed April 23, 1953 for Dual-Period Gyrocompass, a similar result may be obtained by inclining the pivotal axis of each pendulum attaching it to the case at opposite angles to the E-W axis of the compass and limiting the tilt of each with respect to the rotor case to one direction only.

Referring to the drawings showing two forms of my invention:

Fig. 4 is a south elevation looking north of a modified form of my invention using pendulums instead of a liquid ballistic with the gimbal or binnacle mounting omitted;

Fig. 5 is a top view of the same with the same omission; and

Fig. 6 is a detail partial section of one of the pendulums and its mounting.

Figure 1:
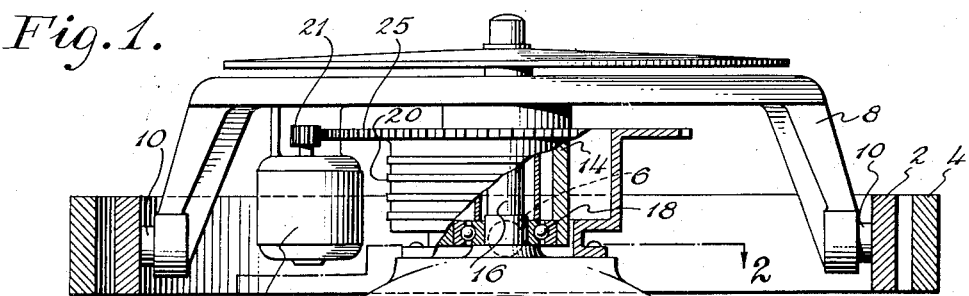
Fig. 1 is a south elevation, partly in section, looking north showing my invention applied to a gyro compass of a liquid ballistic, reverse gimbal type.

To illustrate the first embodiment of my invention, I have selected the form of gyro compass shown in my aforesaid patent application Serial No. 213,262, but my invention is obviously applicable to other forms of gyro compasses of the reverse gimbal type. My gyro compass is shown as comprising a rotor case 1 supported in the usual gimbal ring 2 within the binnacle ring 4 on a trunnion axis 6 normal to the plane of the paper in Fig. 1. The compass spider 8 is pivoted within the gimbal ring 2 on a second trunnion axis 10—10 normal to axis 6. The follow-up ring or phantom 12 of the compass is journalled for rotation about a vertical axis within a downward extending housing or sleeve 14 of the spider 8, the phantom 12 being shown as having an upwardly extending stub shaft 16 journalled in spaced bearings 18 within housing 14 of the spider. Slip rings 20 are shown for leading current into the spinning motors (not shown) within the case 1 of the double rotors 3 and into the follow-up controller 23 which is of the inductive type. The follow-up or azimuth motor 22 controlled therefrom is shown geared to the phantom through pinion 21 and gear 25. The inductive pick-off for the follow-up system is shown as comprising the usual E- or three-legged transformer 23 secured to the phantom and a soft iron armature 46 secured to an arm 49 projecting from the rotor case. For the sake of symmetry and balancing, a mass 47 may be secured to the opposite side of the rotor case.

The vertical ring 24 is mounted for freedom about a horizontal axis on trunnion 26, 26' within the phantom. The rotor case 1 is journalled in the vertical ring in normally vertical bearings 30, 30'. A hollow shaft 32 forming the trunnions for such bearings is shown as extending through and above and below the rotor case within which it is rigidly clamped. Through such hollow shaft extends a wire suspension 34, by means of which the rotor case is suspended from the top of the vertical ring from bracket or block 35. At the bottom, said wire 34 is clamped to a block 31 secured to the bottom of the tube 32 so that the entire weight of the case is supported by the wire 34 through the block 31 at the bottom thereof and the block 35 at the top support on the vertical ring. Meridian seeking properties are imparted to the compass by a liquid ballistic arrangement comprising liquid containers 36 and 38, which are preferably secured to the N–S ends of the rotor case 1 and are connected preferably at both top and bottom by pipes 40 and 42.

Figure 3:
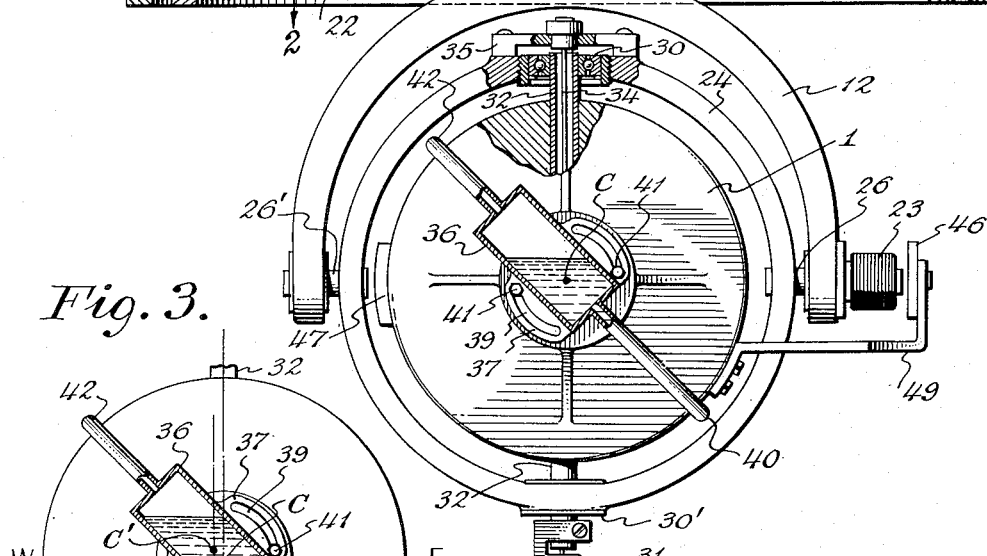
Fig. 3 shows the position assumed by the mercury on exaggerated scale when the rotor case is inclined toward the observer.
Figure 2:
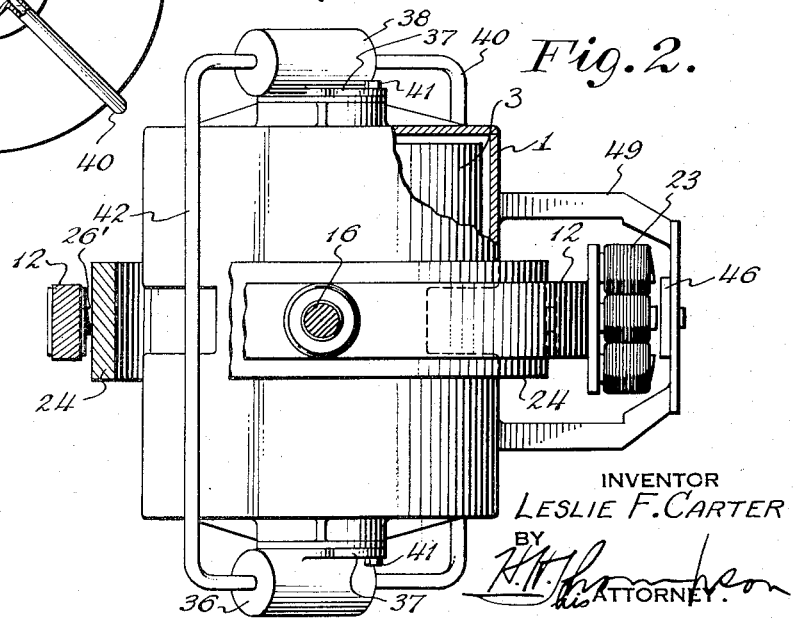
Fig. 2 is a top horizontal section thereof looking down, and taken approximately on line 2—2 in Fig. 1.

The liquid containers, however, are mounted differently and have a different construction than has heretofore been employed in the art, being so arranged and designed as to impart both meridian seeking and damping properties to the compass. For this purpose, the side walls of the two containers are inclined somewhat to the vertical by like angles in the E–W plane of the compass, and are so positioned that when the gyro case is level, the center of gravity C of the liquid in both tanks coincides with the center of support of the gyro casing and its rotors. If, however, the south end (for instance) of the gyro is lowered, which condition is represented in Fig. 3, the liquid level will rise in the south tank, the walls of which are inclined toward the west side of the compass. The center of gravity of the liquid consequently moves both to the south and west of the central vertical axis of the gyroscope and also rises slightly in the south tank (as shown at C' in Fig. 3) while the opposite effect takes place in the north tank. The preponderance of liquid to the west side of the vertical axis constitutes the gravitational damping torque about the vertical axis, which is of the proper sign for a compass of the liquid ballistic type in which the rotor or rotors spin anti-earthwise. When opposite tilt of the case occurs, the preponderance of liquid will occur in the north tank likewise causing a shift of the center of gravity to the west, but the torque is then reversed because of the preponderance of liquid in the north tank, so that torque is again in the direction to reduce the tilt.

The inclination of the tanks is chosen so as to give the compass the proper damping factor, the inclination being exaggerated in the drawings for the sake of clearness. The inclination of the tanks is preferably made adjustable about the N–S axis at the point of their attachment to the rotor case so that the damping factor may be varied if desired. For this purpose, the plates 37 on which the tanks 36, 38 are mounted are provided with arcuate slots 39 through which bolts or set screws 41, attached to the ends of the rotor case, extend. By loosening the bolts 41, the tanks may be readily adjusted to the desired angle and again clamped in place.

As is well understood in the art, the pipes 40, 42 connecting the liquid containers are of small bore to constrain the flow of liquid between the tanks so that the flow between the containers is out of phase with the relatively quick roll and pitch periods of the ship thereby avoiding so called intercardinal rolling error. It will be observed that by this same means the disturbing effect of rolling and pitching on the damping factor is also avoided since both damping and meridian seeking are effected by the same element, namely, the relative position of the center of gravity of the liquid in the containers and the center of support of the case about its E–W axis.

In general, the same idea of avoiding errors in gyro compasses may be applied to a compass having a pendulous or anti-pendulous meridian seeking factor, as shown in Figs. 4, 5 and 6. For illustrative purposes, the form of compass shown in my aforesaid continuing application Serial No. 350,634 has been selected, although in the present application I have shown the pendulums as pivoted from points above their center of gravity instead of below, and each pendulum as operating separately instead of together, as in my continuing application. For simplicity, the same general type of gyro compass is shown in these figures as in Fig. 1. Obviously, both forms of my invention may be applied to other types of gyro compasses including the single rotor type as shown in the aforesaid Rawlings patent.

In Figs. 4 to 6, the meridian seeking properties are imparted to the compass by pivoting on the rotor case a pendulous means, the center of gravity of which lies on an axis in line with the E–W axis of the compass in a normal position. The pivotal mounting is so arranged, however, that upon inclination of the compass, the center of gravity of the pendulous means will be shifted to the west as in Fig. 1 so as to exert a damping torque in a direction to reduce the tilt regardless of the direction of tilt, as well as to the low side for meridian seeking purposes.

An analysis of the problem shows that for this purpose two pendulums 50 and 50' are required which normally hang freely near the ends of the rotor case but the free swinging movement of said pendulums with respect to the case, is retarded by means of viscous dampers 52. Said dampers are shown in the form of partitioned boxes 60, 60' secured to the bottom of the rotor case, which are partially filled with a viscous liquid. Paddles 62, 62' on the bottom of the pendulums dip into the liquid so as to retard relative tilt between the case and pendulums to throw the swing of the pendulums out of phase with the roll of the ship.

According to my invention, the pivotal axis 54, 54' of each pendulum is normally horizontal but is inclined slightly to the E–W axis of symmetry of the compass, the pivotal axis 54 of the pendulum 50 on the south side of the compass being inclined at a negative angle to the E–W axis of the compass (as viewed from the top), while the pivotal axis 54' of the pendulum 50' on the north side is inclined at a positive angle.

In addition to the viscous damper, I also provide a stop pin 64 between each pendulum and the rotor case which prevents relative inclination of each pendulum and rotor case in one direction but permits such relative inclination in the other direction, the two pendulums being permitted to swing in opposite directions only with respect to the case. With this construction, it will be noted that the forward tilt of the gyro in Fig. 6 will not only result in the pendulum 50 exerting an up-setting torque on the gyro about the E-W axis (the meridian seeking torque), but will also shift the center of gravity of the pendulum slightly to the west so as to exert a damping torque about the vertical axis as in Fig. 4. At this time the pendulum 50' will exert no torque because of its contact with the stop pin 64. In other words, since the pendulum is balanced about the E-W axis, as the case becomes inclined it will lift the pendulum without exerting appreciable torque on the gyro. Upon opposite tilt of the gyro, however, the reverse takes place and the meridian seeking and damping torque is exerted entirely by the pendulum 50' and it will be seen by analysis that the damping torque remains in the proper direction to reduce the tilt.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A gyro compass having a follow-up element, a gimbal ring pivoted therein on a normally horizontal axis, a rotor case pivoted in said ring about a normally vertical axis, and a meridian seeking factor mounted on said case so constructed and arranged as to cause N-S shift of its center of gravity upon inclination of the case to exert a meridian seeking torque about said horizontal axis and to simultaneously cause a westerly shift of the center of gravity to exert a damping torque about said vertical axis in a direction to reduce the tilt.

2. A gyro compass as claimed in claim 1, in which said meridian seeking factor comprises a liquid ballistic secured to the case having liquid containers with walls inclined to the west of the vertical.

3. A gyro compass as claimed in claim 1, in which said meridian seeking factor comprises a pair of pendulums pivoted on opposite sides of the case on axes at opposite angles to the E-W axis of the compass, means for preventing relative swing with respect to the case of each pendulum in one direction only, and a damper for each pendulum acting between it and the case.

4. A gyro compass having a follow-up element, a gimbal ring pivoted therein on a normally horizontal axis, a rotor case pivoted in said ring about a normally vertical axis, liquid containers symmetrically secured respectively on the north and south sides of said case, and a restricted pipe connecting said containers, the walls of said containers being inclined to west, so that when said case is level, the liquid in said containers exerts no torque on said case, but when said case is tilted the liquid exerts a torque about both said horizontal axis for meridian seeking purposes and said vertical axis for damping purposes.

5. A gyro compass having a follow-up element, a gimbal ring pivoted therein on a normally horizontal axis, a rotor case pivoted in said ring about a normally vertical axis, and pendulums pivotally mounted on said case to exert torques about said horizontal axis upon tilt of the case, and damping means for each pendulum, the pivotal axes of the two pendulums being placed at a convergent angle to the E-W axis of the compass, whereby uopn tilt in either direction the center of gravity of the pendulums is shifted to the west for damping purposes.

6. A gyro compass having a follow-up element, a gimbal ring pivoted therein on a normally horizontal axis, a rotor case pivoted in said ring about a normally vertical axis, and pendulums pivotally mounted on said case to exert torques about said horizontal axis upon tilt of the case, a stop for each pendulum preventing relative tilt thereof with respect to the case in one direction only, and damping means for each pendulum, the pivotal axes of the two pendulums being placed at a convergent angle to the E-W axis of the compass, whereby upon tilt, the center of gravity of the pendulums is shifted to the west for damping purposes.

No references cited.